(12) United States Patent
Lee

(10) Patent No.: US 8,193,759 B2
(45) Date of Patent: Jun. 5, 2012

(54) REMOTE CONTROL WITH SOLAR-POWERED BATTERY

(75) Inventor: Tsung-Kuang Lee, Ta Kang Village (TW)

(73) Assignee: Display Star Technology Co., Ltd., Taipei (TW)

( * ) Notice: Subject to any disclaimer, the term of this patent is extended or adjusted under 35 U.S.C. 154(b) by 378 days.

(21) Appl. No.: 12/644,005

(22) Filed: Dec. 21, 2009

(65) Prior Publication Data

US 2011/0148341 A1  Jun. 23, 2011

(51) Int. Cl.
*H01M 10/46* (2006.01)
(52) U.S. Cl. .................................................. 320/101
(58) Field of Classification Search .............. 320/101, 320/107, 114, 115; 136/291, 293; 455/128; 348/164, 734
See application file for complete search history.

(56) References Cited

U.S. PATENT DOCUMENTS

| | | | |
|---|---|---|---|
| 7,603,080 B2 * | 10/2009 | Richenstein et al. | 455/3.06 |
| 2003/0083024 A1 * | 5/2003 | Richenstein et al. | 455/99 |

\* cited by examiner

*Primary Examiner* — Edward Tso

(57) ABSTRACT

A remote control with a solar-powered battery, a remote body includes the control panel. The control panel has a plurality of buttons. The solar-powered battery module is disposed in the remote and comprises the solar panel, the control unit and the storage unit. The solar panel is a rigid or flexible solar panel and is used for receiving light energy. The wireless control module disposed in the remote comprises the transmitting unit, the sensing unit and the activating unit. Therefore, the solar-powered battery module converts and stores the light energy and provides power to the wireless control module, thereby providing energy savings and environmental conservation benefits.

7 Claims, 4 Drawing Sheets

REMOTE CONTROL WITH SOLAR-POWERED BATTERY

BACKGROUND OF THE INVENTION

1. Field of the Invention

The present invention relates to a remote control with a solar-powered battery, and more particularly to remote control with a solar-powered battery which provides energy-savings and is environmentally friendly.

2. Description of the Related Art

Currently, wireless or infrared remotes are often used for controlling TVs, video machines, air conditioners, stereos, etc., as well as household appliances, garage doors, car doors, etc. These remotes are for remote control use only, but the power consumed with each use is incapable of being supplied by a small-sized, solar-powered battery. Therefore, all of these remotes require standard, non-reusable batteries, which leads to environmental pollution and waste of resources.

In contrast, solar energy is free and is a zero-emissions energy source, and thus has become one of the most popular renewable energy technologies. More and more electrical products are utilizing solar panels to convert solar energy into usable power.

Solar energy can supply power for small-sized and low-power products (such as calculators) under normal light conditions; it also can supply power for large-sized products (such as a solar-powered water boiler) under daylight conditions with a rechargeable battery for storing the resultant electrical energy.

Therefore, it is desirable to provide a remote control with a solar-powered battery to mitigate and/or obviate the aforementioned problems.

SUMMARY OF THE INVENTION

An objective of the present invention is to provide a remote control with solar-powered battery using a solar panel with a storage unit to transform light energy into electric energy for a wireless control module for remote operation, thereby providing energy savings and environmental conservation benefits.

In order to achieve the above-mentioned objectives, a remote control of the present invention with a solar-powered battery, a remote body includes the control panel. The control panel has a plurality of buttons. The solar-powered battery module is disposed in the remote and comprises the solar panel, the control unit and the storage unit. The solar panel is a rigid or flexible solar panel and is used for receiving light energy. The wireless control module disposed in the remote comprises the transmitting unit, the sensing unit and the activating unit. Therefore, the solar-powered battery module converts and stores the light energy and provides power to the wireless control module, thereby providing energy savings and environmental conservation benefits.

Other objects, advantages, and novel features of the invention will become more apparent from the following detailed description when taken in conjunction with the accompanying drawings.

DETAILED DESCRIPTION OF THE PREFERRED EMBODIMENT

A remote control with solar-powered battery of the present invention combines together solar energy receiving capabilities, electrical energy storage capabilities and wireless control capabilities for energy saving purposes.

Figure 1A:
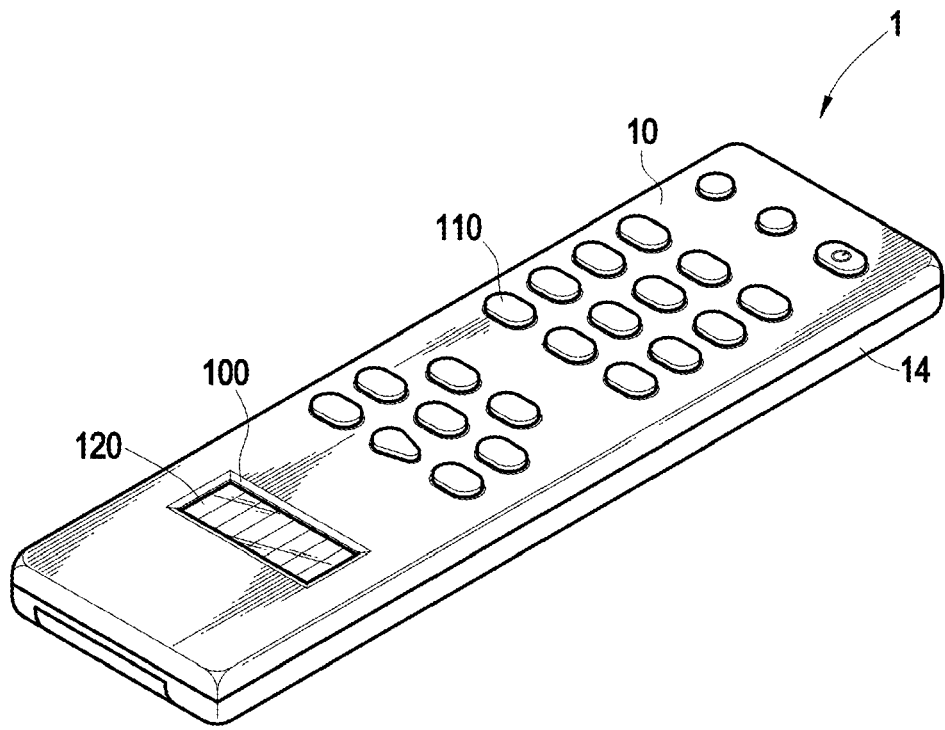
FIG. 1A is a perspective view of a remote control with solar-powered battery according to an embodiment of the present invention.
Figure 1B:
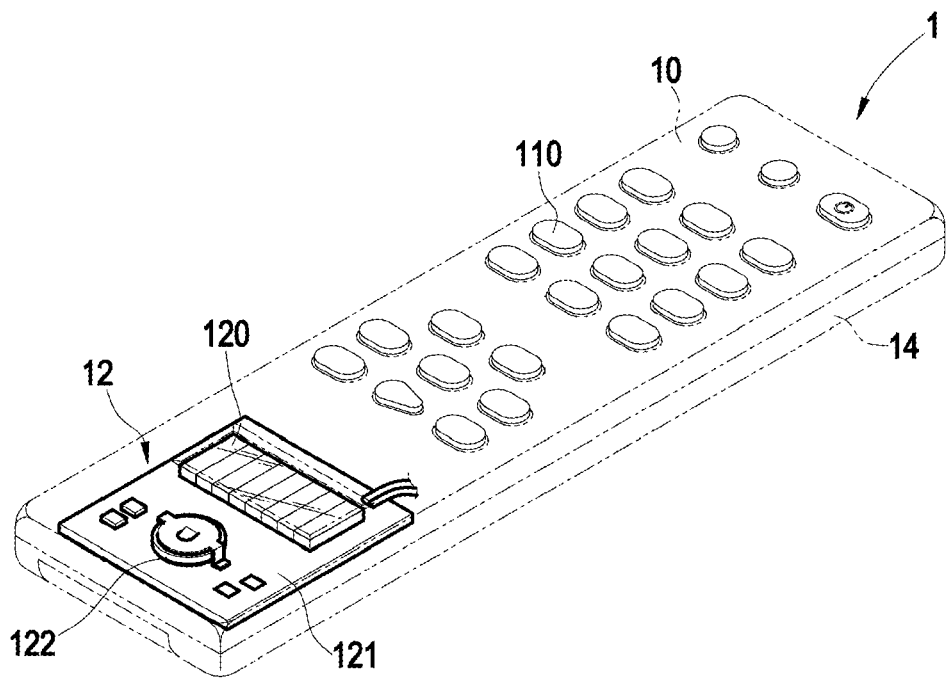
FIG. 1B is a schematic drawing of a solar-powered battery module of a remote control with solar-powered battery according to an embodiment of the present invention.
Figure 2:
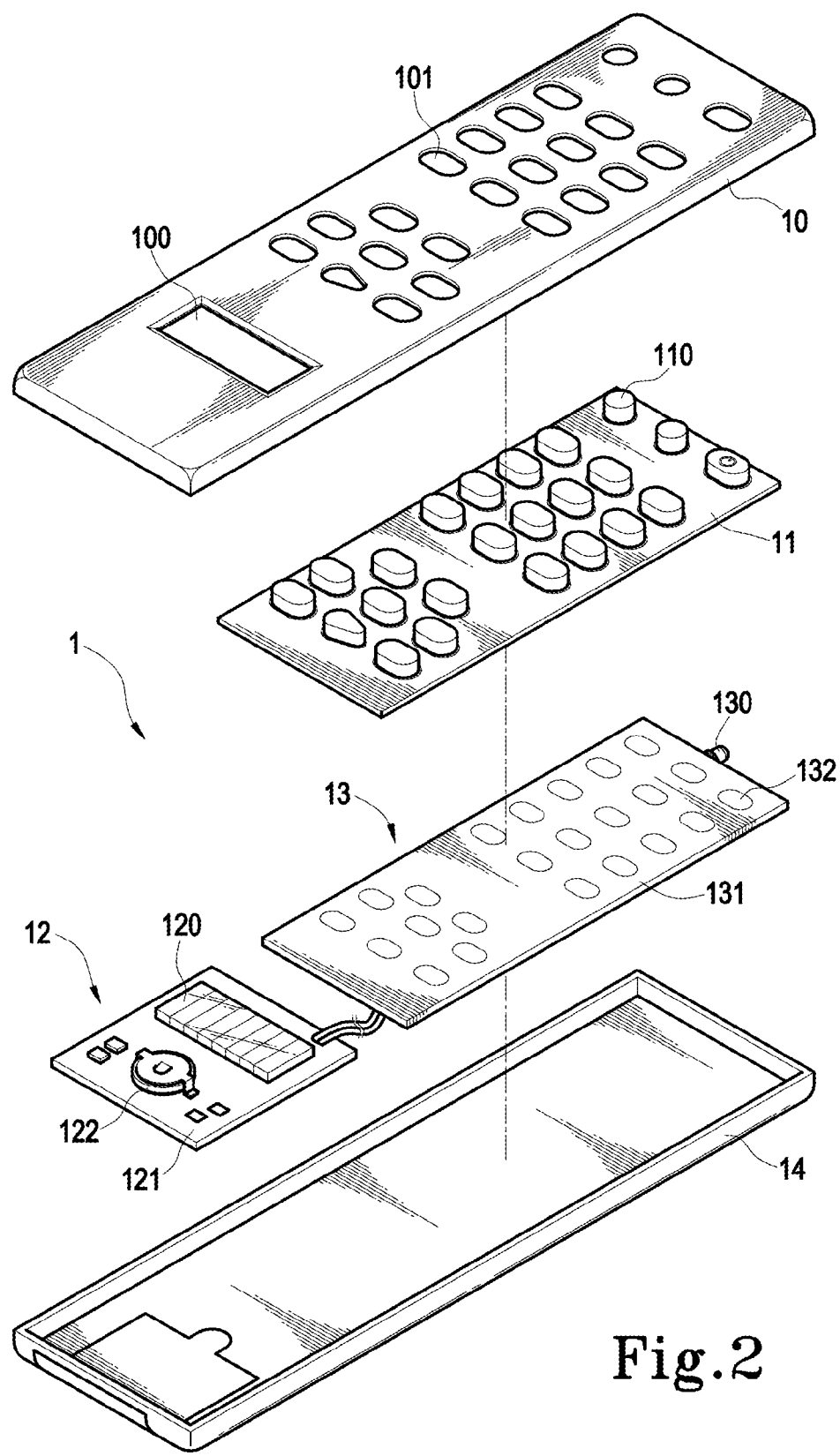
FIG. 2 is an exploded perspective view of a remote control with solar-powered battery according to an embodiment of the present invention.

Please refer to FIG. 1A, FIG. 1B and FIG. 2. As shown in the drawings, in an embodiment remote control with solar-powered battery, a remote 1 body comprises an upper cover 10 and a lower cover 14 having a control panel 11, a solar energy battery module 12 and a wireless control module 13. The control panel 11 is disposed on the wireless control module 13 of the remote 1 and has a plurality of buttons 110, and each button 110 corresponds to an activating unit 132 of the wireless control module 13 and is used for selecting and transmitting signals to the transmitting unit 130 of the wireless control module 13. The solar-powered battery module 12 is disposed in the remote 1 and electrically connected to the wireless control module 13. The solar-powered battery module 12 comprises a solar panel 120, a control unit 121 and a storage unit 122. The solar panel 120 is a rigid or flexible solar panel and is used for receiving light energy. The control unit 121 is an electrical energy transforming interface, which is able to transform the solar energy received from the solar panel 120 into electrical energy for the remote 1. The storage unit 122 is an electrical energy storage interface and is used for storing electrical energy obtained from the light energy through the control unit 121. Alternatively, the storage unit is also a rechargeable battery which transforms the light energy into electrical energy for the remote 1, and is electrically connected to the wireless control module 13 to provide electrical energy for the wireless control module 13. The wireless control module 13 is disposed in the remote 1 and electrically connected to the solar-powered battery module 12, and the wireless control module 13 comprises a transmitting unit 130, a sensing unit 131 and an activating unit 132 for signal transmission and reception of electrical energy. The transmitting unit 130 is an LED or a radio frequency chip. The sensing unit 131 generates control signals for operations according to the status of the button 110 of the control panel 11 and utilizes the electrically connected transmitting unit 130 to transmit signals to a target receiver (not shown), such that the target receiver (such as an air conditioner, a stereo, a car door, etc.) performs its predetermined operation. The activating unit 132 is electrically connected to the transmitting unit 130 and the sensing unit 131 and receives power supply signals.

The wireless control module 13 further comprises a protection loop, wherein when a button 110 of the control panel 11 presses the activating unit 132 of the wireless control module 13 and the press time is longer than a predetermined time limit (such as 10 seconds) the protection loop automatically stops the signal transmission to prevent waste of power, and additionally stops operations when the voltage is lower than 2.5V to prevent the battery from being damaged. Therefore, the protection loop can increase the lifetimes of both the remote and the battery.

Accordingly, the solar panel 120 receives and transforms light into storable electrical energy to replace the conventional battery within the remote 1.

Figure 3A:
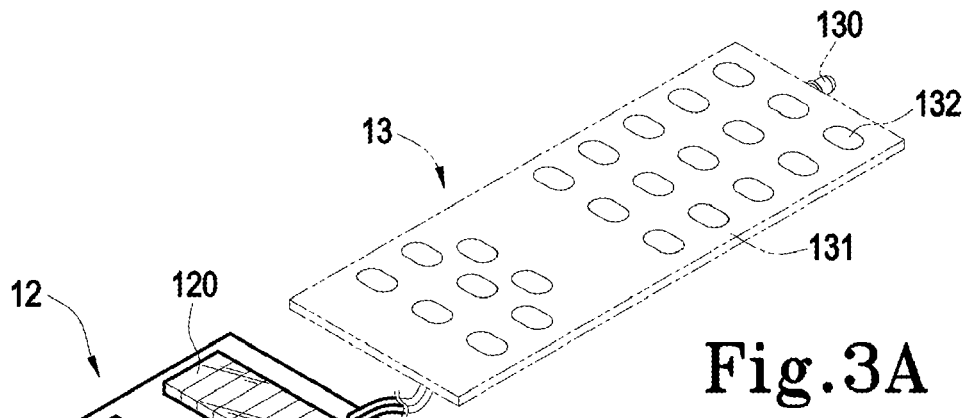
FIG. 3A is a schematic drawing of a storage unit of a remote control with solar-powered battery according to an embodiment of the present invention.
Figure 3B:
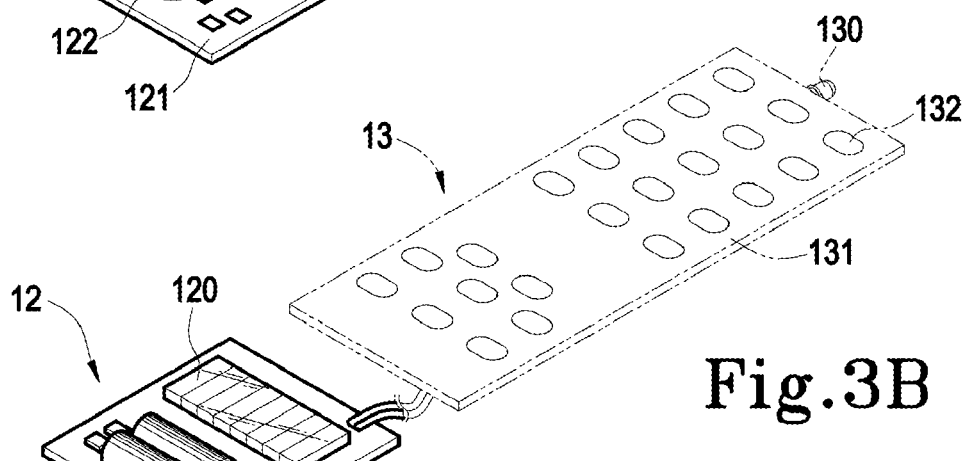
FIG. 3B is a schematic drawing of another embodiment of a remote control with solar-powered battery according to the present invention.
Figure 3C:
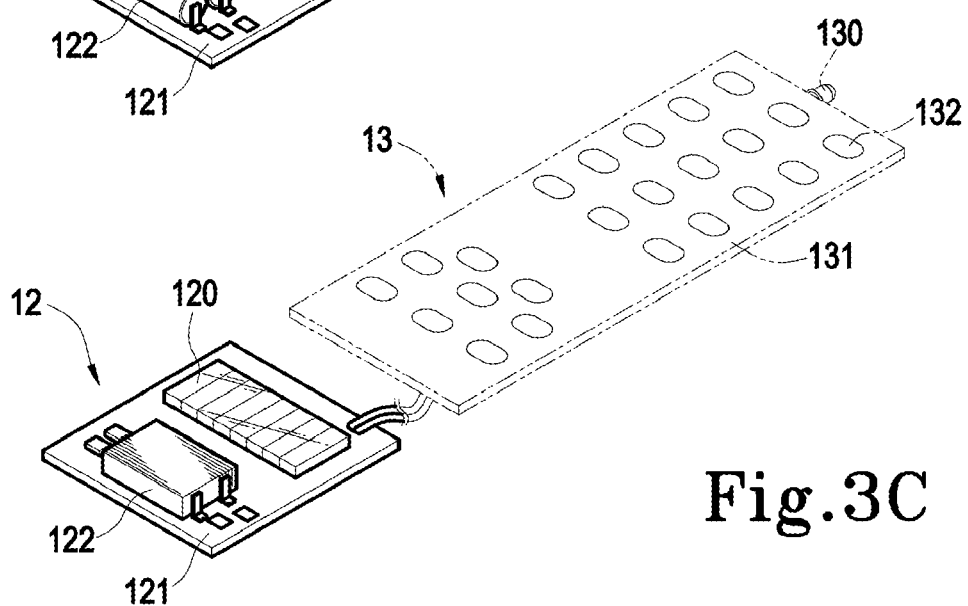
FIG. 3C is a schematic drawing of another embodiment of a remote control with solar-powered battery according to the present invention.

Please refer to FIGS. 3A, 3B and 3C. As shown in the drawings, the solar-powered battery module 12 is electrically connected to the wireless control module 13, and the solar panel 130 of the solar-powered battery module 12 receives light for conversion into electrical energy by the control unit 121 and which is stored in the storage unit 122 for maintaining power levels. The storage unit 122 is an electrical energy storage element, and the storage unit 122 may be a mercury battery, a rechargeable battery, a Li battery or a super-capacitor, which can extend the life-time of the storage unit 122.

Figure 4:
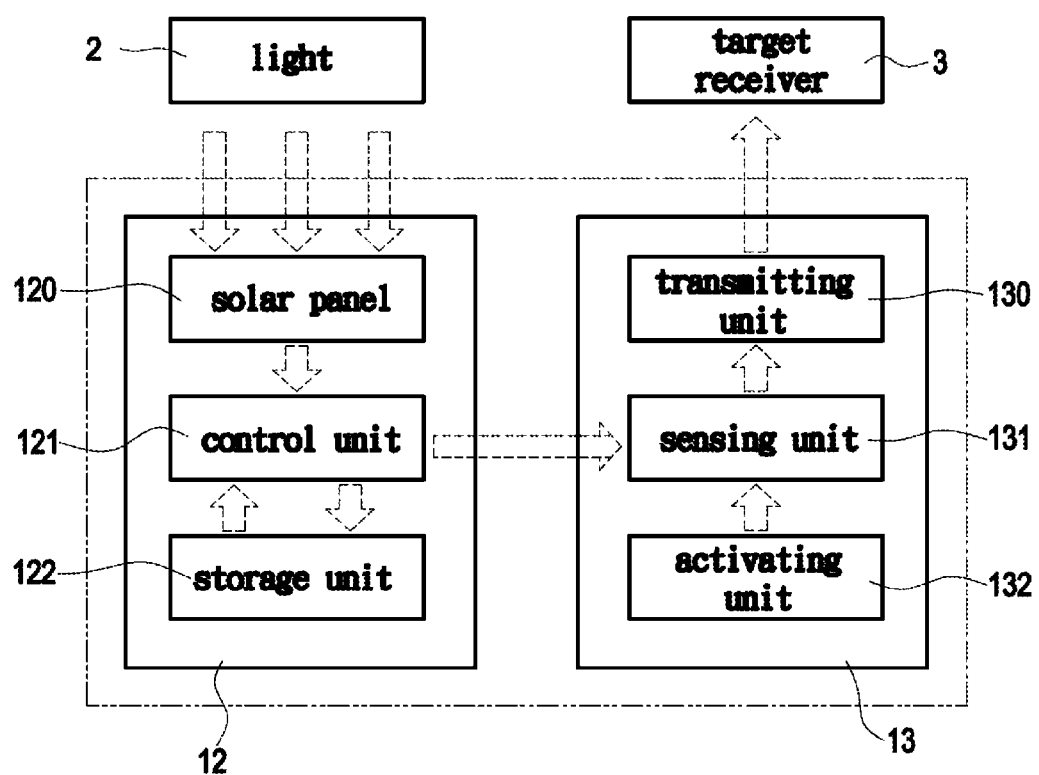
FIG. 4 is a block drawing of a remote control with solar-powered battery according to an embodiment of the present invention.

Please also refer to FIG. 4. FIG. 4 is a block drawing of a remote control with solar-powered battery according to an embodiment of the present invention. The remote 1 comprises the solar-powered battery module 12 and the wireless control module 13 among the upper cover 10, the lower cover 14 and the control panel 11. The solar-powered battery module 12 further comprises the solar panel 120, the control unit 121 and the storage unit 122. The wireless control module 13 comprises the transmitting unit 130, the sensing unit 131 and the activating unit 132.

The solar panel 120 is used for receiving light energy. The control unit 121 is able to transform the solar energy received by the solar panel 120 into electrical energy for the remote 1. The storage unit 122 is used for storing electrical energy converted from the light energy by the control unit 121 through the control unit 121. The storage unit 122 may be a rechargeable battery. The control unit 121 is electrically connected to the solar panel 120 and the storage unit 122 and is used for transforming light energy into electrical energy for saving in the storage unit 122.

The sensing unit 131 of the wireless control module 13 is used for sensing the press time applied to the control panel 11 (not shown) and is electrically connected to the transmitting unit 130 and the activating unit 132. The power for the wireless control module 13 is supplied by the storage unit 122 of the solar-powered battery module 12a, and the signals delivered from the activating unit 132 to the sensing unit 131 are transmitted to the target receiver via infrared light or radio frequency signals from the transmitting unit 130.

The wireless control module 13 further comprises a protection loop, wherein when a button 110 of the control panel 11 presses the activating unit 132 of the wireless control module 13 and the press time exceeds a predetermined time limit (such as 10 seconds) the protection loop automatically stops signal transmissions to prevent waste of power, and further stops operations when the voltage is lower than 2.5V to prevent the battery from being damaged. The protection loop can thus increase both the lifetime of the remote and the battery.

When light 2 shines onto the solar panel 120 of the solar energy battery module 12, the control unit 121 transforms the light energy into electrical energy and saves the electrical energy in the storage unit 122. When the activating unit 132 of the wireless control module 13 is activated by the sensing unit 131 and powered by the storage unit 122, the sensing unit 131 electrically connected to the transmitting unit 130 transmits signals to the target receiver 3 using infrared light or radio frequency signals. Therefore, the solar energy is converted into supply power for energy savings and environmental conservation effects.

In the remote control with a solar-powered battery, a remote 1 body includes the control panel 11. The control panel 11 has a plurality of buttons 110. The solar-powered battery module 12 is disposed in the remote 1 and comprises the solar panel 120, the control unit 121 and the storage unit 122. The solar panel 120 is a rigid or flexible solar panel and is used for receiving light energy. The wireless control module 13 disposed in the remote 1 comprises the transmitting unit 130, the sensing unit 131 and the activating unit 132. Therefore, the solar-powered battery module 12 converts and stores the light energy and provides power to the wireless control module 13, thereby providing energy savings and environmental conservation benefits.

Although the present invention has been explained in relation to its preferred embodiment, it is to be understood that many other possible modifications and variations can be made without departing from the spirit and scope of the invention as hereinafter claimed.

What is claimed is:

1. A remote control with solar-powered battery comprising an upper cover, a lower cover, a control panel, a solar-powered battery module and a wireless control module; wherein
the control panel is disposed in the remote control and has a plurality of buttons;
a solar-powered battery module comprising: a solar panel for receiving light energy; a control unit for transforming light energy received by the solar panel into electric energy; and a storage unit for storing the electric energy transformed by the control unit, the storage unit disposed in the remote control and electrically connected to the wireless control module to provide power to the wireless control module; and
a wireless control module comprising a transmitting unit electrically connected to a sensing unit and sending signals to a target receiver according to the sensing unit; the sensing unit corresponding to the control panel; and an activating unit electrically connected to the sensing unit and the solar-powered battery module for receiving power supply signals, the activating unit disposed in the remote;
characterized in that:
the wireless control module further comprises a protection loop, wherein when a button of the control panel presses the activating unit of the wireless control module and the press time is longer than a predetermined time limit the protection loop automatically stops the signal transmission to prevent waste of power, and stops operations when the voltage is lower than 2.5V to prevent the battery from being damaged.

2. The remote control with solar-powered battery as claimed in claim 1, wherein the storage unit is a rechargeable battery.

3. The remote control with solar-powered battery as claimed in claim 2, wherein the rechargeable battery is a Li battery.

4. The remote control with solar-powered battery as claimed in claim 2, wherein the rechargeable battery is a super capacitor.

5. The remote control with solar-powered battery as claimed in claim 1, wherein the transmitting unit comprises a light transmitting unit.

6. The remote control with solar-powered battery as claimed in claim 5, wherein the light transmitting unit is an infrared transmitting unit.

7. The remote control with solar-powered battery as claimed in claim 1, wherein the transmitting unit further comprises a radio frequency transmitting unit.

* * * * *